(12) United States Patent
Nenner et al.

(10) Patent No.: US 10,798,655 B2
(45) Date of Patent: Oct. 6, 2020

(54) ENHANCED POWER CONSUMPTION MANAGEMENT OF A USER EQUIPMENT USING A MOBILE COMMUNICATION NETWORK, WHEREIN DIFFERENT SETS OF RADIO RESOURCES ARE USED IN DEPENDENCY OF A POWER CONSUMPTION INFORMATION

(71) Applicant: Deutsche Telekom AG, Bonn (DE)

(72) Inventors: Karl-Heinz Nenner, Bornheim (DE); Axel Klatt, Cologne (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/753,549

(22) PCT Filed: Jul. 15, 2016

(86) PCT No.: PCT/EP2016/066954
§ 371 (c)(1),
(2) Date: Feb. 20, 2018

(87) PCT Pub. No.: WO2017/036656
PCT Pub. Date: Mar. 9, 2017

(65) Prior Publication Data
US 2018/0242256 A1  Aug. 23, 2018

(30) Foreign Application Priority Data

Sep. 3, 2015 (EP) .................................. 15183692

(51) Int. Cl.
*H04W 52/02* (2009.01)

(52) U.S. Cl.
CPC ... *H04W 52/0261* (2013.01); *H04W 52/0216* (2013.01); *H04W 52/0258* (2013.01);
(Continued)

(58) Field of Classification Search
None
See application file for complete search history.

(56) References Cited

U.S. PATENT DOCUMENTS

| | | | |
|---|---|---|---|
| 2004/0090934 A1* | 5/2004 | Cha | H04L 47/14 370/329 |
| 2005/0048960 A1* | 3/2005 | Yamauchi | H04W 52/0267 455/418 |

(Continued)

*Primary Examiner* — Rasheed Gidado
(74) *Attorney, Agent, or Firm* — Leydig, Voit & Mayer, Ltd.

(57) ABSTRACT

A method for power consumption management of a user equipment using a mobile communication network includes: in a first step, a set of first radio resources is assigned, by a radio resource management entity, to the user equipment for transmitting uplink data and/or receiving downlink data; in a second step, subsequent to the first step, power consumption information is obtained by the radio resource management entity, the power consumption information indicating that a current power consumption of the user equipment using the assigned set of first radio resources is above a predefined upper power consumption threshold or below a predefined lower power consumption threshold; and in a third step, subsequent to the second step, a set of second radio resources is assigned, by the radio resource management entity, to the user equipment for transmitting uplink data and/or receiving downlink data.

11 Claims, 1 Drawing Sheet

(52) U.S. Cl.
CPC .......... *Y02D 70/00* (2018.01); *Y02D 70/1224* (2018.01); *Y02D 70/1242* (2018.01); *Y02D 70/1262* (2018.01); *Y02D 70/142* (2018.01)

(56) References Cited

U.S. PATENT DOCUMENTS

| | | |
|---|---|---|
| 2007/0260897 A1* | 11/2007 | Cochran ................. G06F 1/263 713/300 |
| 2008/0268917 A1* | 10/2008 | Chang ............... H04W 52/0261 455/574 |
| 2012/0135696 A1* | 5/2012 | Lerzer ............... H04W 52/0296 455/127.1 |
| 2012/0170436 A1* | 7/2012 | Fujiune ................ G11B 7/0062 369/59.11 |
| 2013/0021960 A1 | 1/2013 | Lee et al. |
| 2014/0051438 A1* | 2/2014 | Chen ................. H04W 52/0261 455/434 |
| 2014/0080459 A1 | 3/2014 | Taha et al. |
| 2014/0092771 A1* | 4/2014 | Siomina ................ H04W 24/08 370/252 |
| 2015/0237103 A1 | 8/2015 | Lotfallah et al. |
| 2016/0337165 A1* | 11/2016 | Mujtaba ............ H04W 52/0251 |
| 2017/0329382 A1* | 11/2017 | Guo .......................... G06F 9/44 |

* cited by examiner

ENHANCED POWER CONSUMPTION MANAGEMENT OF A USER EQUIPMENT USING A MOBILE COMMUNICATION NETWORK, WHEREIN DIFFERENT SETS OF RADIO RESOURCES ARE USED IN DEPENDENCY OF A POWER CONSUMPTION INFORMATION

CROSS-REFERENCE TO RELATED APPLICATIONS

This application is a U.S. National Phase application under 35 U.S.C. § 371 of International Application No. PCT/EP2016/066954, filed on Jul. 15, 2016, and claims benefit to European Patent Application No. EP 15183692.1, filed on Sep. 3, 2015. The International Application was published in English on Mar. 9, 2017 as WO 2017/036656 under PCT Article 21(2).

FIELD

The present invention relates inter alia to a method for enhanced power consumption management of a user equipment using a mobile communication network, wherein the mobile communication network comprises a core network and an access network, wherein the access network comprises a plurality of base station entities, wherein the user equipment is, at least temporarily, in communication exchange—in uplink and/or in downlink direction—with the mobile communication network using radio resources of the air interface between the user equipment and the access network such that a plurality of radio access technologies and/or a plurality of radio signal transmission schemes are able to be used.

Furthermore, the present invention relates to a mobile communication network for enhanced power consumption management of a user equipment using the mobile communication network, wherein the mobile communication network comprises a core network and an access network, wherein the access network comprises a plurality of base station entities, wherein the user equipment is, at least temporarily, in communication exchange—in uplink and/or in downlink direction—with the mobile communication network using radio resources of the air interface between the user equipment and the access network such that a plurality of radio access technologies and/or a plurality of radio signal transmission schemes are able to be used.

Furthermore, the present invention relates to a program comprising a computer readable program code, and to a computer program product for using a mobile communication network in accordance with exemplary embodiments of the invention.

BACKGROUND

It is estimated that the global information and communication technology industry is responsible for an increasing part of the global emissions of carbon dioxide. The number of worldwide mobile phone subscriptions is continuously increasing and is likely to rise beyond several billion.

Likewise, the mobile devices associated to these mobile phone or mobile device subscriptions need to be charged as well, requiring a growing share of global energy consumption as well.

In general, radio resource management of a mobile communication network attempts to assign radio resources to the served user equipments to fulfill the current quality-of-service needs as much as possible. Another optimization aspect for the scheduler (of a radio resource management entity of a mobile communication network) is the efficient data transmission in order to maximize network efficiency.

It is known in conventional mobile communication networks, especially public land mobile networks or telecommunications networks for mobile communication, to realize different kinds of accesses or attachments of user equipments to the mobile communication network (or different radio access technologies, RATs), such as, e.g. 2G access, 3G access, 4G access or 5G access.

SUMMARY

In an exemplary embodiment, the present invention provides a method for power consumption management of a user equipment using a mobile communication network. The mobile communication network comprises a core network and an access network. The access network comprises a plurality of base station entities. The mobile communication network comprises a radio resource management entity. The method comprises the following steps: in a first step, a set of first radio resources is assigned, by the radio resource management entity, to the user equipment for transmitting uplink data and/or receiving downlink data; in a second step, subsequent to the first step, power consumption information is obtained by the radio resource management entity, the power consumption information indicating that a current power consumption of the user equipment using the assigned set of first radio resources is above a predefined upper power consumption threshold or below a predefined lower power consumption threshold; and in a third step, subsequent to the second step, a set of second radio resources is assigned, by the radio resource management entity, to the user equipment for transmitting uplink data and/or receiving downlink data, wherein when using the set of second radio resources, the power consumption of the user equipment using the assigned set of second radio resources is between the lower power consumption threshold and the upper power consumption threshold.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
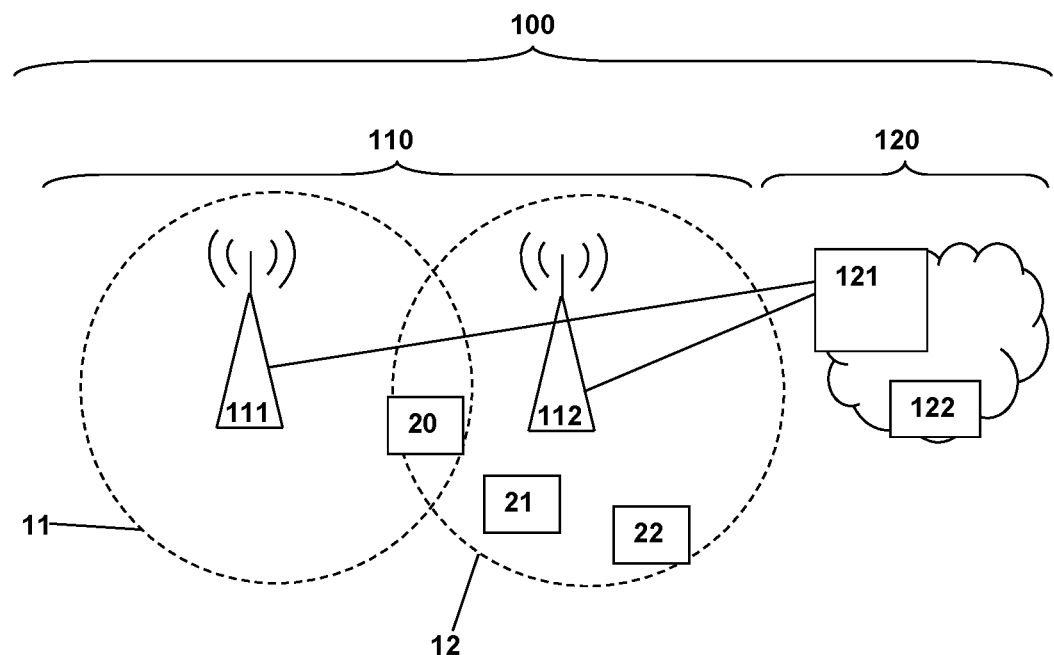
FIG. 1 schematically illustrates a mobile communication network comprising a plurality of radio cells being served by a plurality of base station entities, and a plurality of user equipments being served by the mobile communication network.

Exemplary embodiments of the present invention provide a method for enhanced power consumption management of a user equipment using a mobile communication network, wherein different sets of radio resources are used in dependency of a power consumption information such that scheduling of radio resources and/or the functionality of the radio resource management entity of the mobile communication network is—at least partly—dependent on the current power consumption of the user equipment such that power consumption of user equipments as well electromagnetic compatibility and impact on the user of the user equipment is able to be enhanced.

In an exemplary embodiment, the present invention provides a method for enhanced power consumption management of a user equipment using a mobile communication network, wherein the mobile communication network comprises a core network and an access network, wherein the access network comprises a plurality of base station entities, wherein the user equipment is, at least temporarily, in communication exchange—in uplink and/or in downlink direction of uplink and/or downlink data—with the mobile communication network using radio resources of the air interface between the user equipment and the access network such that a plurality of radio access technologies and/or a plurality of radio signal transmission schemes are able to be used for transmitting uplink data from the user equipment towards the access network of the mobile communication network and/or transmitting downlink data from the access network of the mobile communication network towards the user equipment, wherein the mobile communication network comprises a radio resource management entity, and wherein the method comprises the following steps:

in a first step, a set of first radio resources is assigned, by the radio resource management entity, to the user equipment for transmitting the uplink data and/or for receiving the downlink data, in a second step, subsequent to the first step, a power consumption information is available to the radio resource management entity, the power consumption information being related to or indicative of the current power consumption of the user equipment using the assigned set of first radio resources, wherein the power consumption information indicates a current power consumption of the user equipment that is either above a predefined upper power consumption threshold or below a predefined lower power consumption threshold, in a third step, subsequent to the second step, a set of second radio resources is assigned, by the radio resource management entity, to the user equipment for transmitting the uplink data and/or for receiving the downlink data, wherein when using the set of second radio resources, the current power consumption of the user equipment using the assigned set of second radio resources corresponds to a power consumption in between the lower power consumption threshold and the upper power consumption threshold.

According to the present invention, the user equipment power budget is taken as an additional input into the calculation of the radio resource management entity and corresponding scheduling decisions of the mobile communication network so that the battery consumption of the user equipment stays within a certain limit, or as low as possible (which means that the lower power consumption threshold corresponds to zero). In order to take the power budget of the user equipment as an additional input into the calculation (of scheduling decisions, especially regarding the distribution of available radio resources upon a number of user equipments currently being served by the mobile communication network) of the radio resource management entity, means that at a given (first) point in time, a set of first radio resources is assigned to the user equipment for transmitting uplink data and/or for receiving downlink data, that at an arbitrary point in time subsequent to the first point in time, the mobile communication network establishes—typically via the radio resource management entity and via a power consumption information, the power consumption information relating to a specific user equipment currently served by the mobile communication network—that the current power consumption of the (specific) user equipment (using the assigned set of first radio resources) is outside of a power consumption window (or a certain range of power consumption), i.e. it is established or detected that the power consumption of the user equipment is either above a predefined upper power consumption threshold or below a predefined lower power consumption threshold, and that radio resource management of the mobile communication network modifies the radio resources of the (specific) user equipment such that the (specific) user equipment is assigned at a given (second) point in time, subsequent to the first point in time—different radio resources (of the air interface between the user equipment and the (access network of the) mobile communication network) such that the current power consumption of the (specific) user equipment (using the assigned set of second radio resources) is inside the predefined power consumption window (or range of power consumption), i.e. subsequent to the first point in time, a set of second radio resources is assigned, by the radio resource management entity, to the user equipment for transmitting the uplink data and/or for receiving the downlink data, wherein when using the set of second radio resources, the current power consumption of the user equipment using the assigned set of second radio resources corresponds to a power consumption in between the lower power consumption threshold and the upper power consumption threshold.

It is therefore advantageously possible according to the present invention that the mobile communication network operates the radio resource management entity in a way to at least influence power consumption of the user equipment (via assigning different radio resources to the (specific) user equipment) and preferably to minimize power consumption of the user equipment while possibly staying within an agreed quality-of-service range (or "window").

According to the present invention, it is assumed that the mobile communication network and the user equipment support the selection of a multiplicity of radio access technologies and/or transmission schemes, and/or that the mobile communication network and the user equipment support the combination of a set of these radio access technologies. Possible radio access technologies in this sense are technologies using licensed or unlicensed spectrum, using techniques such GPRS/EDGE, UMTS/HSPA, LTE/LTE-A, WIFI etc. with features like higher-order modulation, power control, MIMO, beam forming, carrier aggregation, etc.

The power driven radio resource management functionality according to the present invention can also be applied to user equipments in idle mode or user equipments in connected mode. In idle mode, the user equipment should be kept in the lowest possible power configuration, e.g. using only a single radio access which is the best from power consumption point of view. In connected mode, the user equipment should be assigned radio resources that allow it to stay within the required quality-of-service window (i.e. between the lower power consumption threshold and the upper power consumption threshold) while adhering to the power budget. Interaction with the packet scheduler can be used in order to optimize the radio resource management functionality according to the currently needed channel throughput of the (specific) user equipment (or also dependent on the quality-of-service needs of other user equipments (than the specific user equipment) nearby)—hence balance power hungry features like higher order modulation and excessive usage of speed optimization features (like multiple carrier LTE-A Carrier Aggregation or parallel WiFi usage).

According to a preferred embodiment of the present invention, the power consumption information is available to the radio resource management entity via a transmission, from the user equipment towards the radio resource management entity, of a current power consumption information.

Thereby, it is advantageously possible that authentic information regarding the power consumption of the user equipment is available to the radio resource management entity of the mobile communication network. According to the present invention, the current power consumption information especially primarily regards power consumption of the user equipment associated with handling the assigned radio resources, i.e. power consumption associated to the radio transmission and reception itself (i.e. for example the transmitter(s) and/or transmission/reception circuitry) and to the associated control circuitry (such processor(s) and/or microcontroller(s) controlling the transmission/reception circuitry) and, hence, the current power consumption information does especially not include parts of the global power consumption of the user equipment that are not related to using specific radio resources (such as, e.g., the power consumption associated with running a certain application (or app) within the user equipment or the like.

According to a further preferred embodiment of the present invention, the power consumption information is available to the radio resource management entity via the radio resource management entity deducing the likely current power consumption of the user equipment, based on an indication or a command, by the radio resource management entity to the user equipment, and/or
  based on the knowledge of the radio resource management entity that the user equipment is using a certain transmission power level and/or a certain radio signal transmission scheme for transmitting the uplink data, and/or
  the radio resource management entity performing a channel estimation in relation to the set of first radio resources that are available for the user equipment (or being used by the user equipment).

Thereby, it is advantageously possible that—in contrast to the user equipment transmitting the current power consumption information according to the previously discussed embodiment—the additional transmission of data from the user equipment to the mobile communication network, especially the radio resource management entity, can be avoided, and hence overhead (to transmit the current power consumption information) reduced.

According to the present invention, by using the set of second radio resources, typically a reduction of power consumption of the user equipment will be the intended result (compared to using the set of first radio resources previously assigned to the user equipment). However, there might be situations such that changing the radio resources (from the set of first radio resources to the set of second radio resources) results in a lower quality-of-service level or at least potentially a lower quality-of-service level (in case, e.g., of transmission channel degradations), thus potentially creating a conflict between the quality-of-service a user typically wants to enjoy or has paid for and the goal of a lower power consumption of the respective user equipment. According to the present invention and in case of such a conflict between quality-of-service window and power budget goals, a preference should be given.

It is therefore preferred according to the present invention that, in addition to the power consumption information, power consumption policy information is made available to the radio resource management entity, wherein the power consumption policy information either comprises an indication of prioritizing the choice of radio resources such that the current power consumption of the user equipment stays in between the lower power consumption threshold and the upper power consumption threshold,
  or comprises an indication of prioritizing the choice of radio resources such that other performance parameters, especially providing a certain quality-of-service to the user equipment, are fulfilled, and where the current power consumption of the user equipment is especially allowed to exceed the upper power consumption threshold.

It is thereby advantageously possible to resolve such situations of a conflict between the required quality-of-service level on the one hand and the required power consumption of the user equipment. In case the power consumption of the user equipment is prioritized (compared to the quality-of-service level), the power consumption policy information indicates this choice (i.e. indicates prioritizing the choice of radio resources such that the current power consumption of the user equipment stays in between the lower power consumption threshold and the upper power consumption threshold). In case the quality-of-service of the user equipment is prioritized (compared to the power consumption of the user equipment), the power consumption policy information indicates this choice (i.e. indicates prioritizing the choice of radio resources such that other performance parameters, especially providing a certain quality-of-service to the user equipment, are fulfilled, and where the current power consumption of the user equipment is especially allowed to exceed the upper power consumption threshold). The preference is especially stored in a location where this information is accessible by the radio resource management entity: According to one embodiment of the present invention, the power consumption policy information is stored in the user equipment (and made available to the mobile communication network, especially to the radio resource management entity); according to another embodiment of the present invention, the power consumption policy information is stored in a network node of the mobile communication network, such as, e.g., the subscriber data/repository, and hence directly or indirectly accessible by the radio resource management entity.

According to still a further preferred embodiment of the present invention, the set of second radio resources is determined—by the mobile communication network, especially by the radio resource management entity—using:

a priori knowledge of the physical parameters and associated typical power consumption needs of different radio access technologies and/or radio signal transmission schemes, and/or a channel estimation in relation to the set of second radio resources, and/or power consumption related information regarding to other user equipments than the user equipment within the mobile communication network.

Thereby, it is advantageously possible according to the present invention that the definition of the set of second radio resources can be based on general experience obtained with regard to different radio access technologies and/or radio signal transmission schemes, and/or on a channel estimation performed on a potential radio link to be assigned to the user equipment and/or on current power consumption information related to other user equipments.

According to another preferred embodiment of the present invention, the plurality of radio access technologies and/or the plurality of radio signal transmission schemes comprise at least one out of the following:

radio access technologies using licensed or unlicensed radio spectrum, radio access technologies using GPRS/EDGE and/or UMTS/HSPA and/or LTE/LTE-A and/or 5G technologies and/or WIFI, radio access technologies and/or radio signal transmission schemes using higher-order modulation and/or power control and/or MIMO (multiple input/multiple output) and/or beam forming and/or carrier aggregation radio access technologies using Narrow-Band radio technologies for Internet-of-Things (NB-IoT).

Thereby, it is advantageously possible according to the present invention that a plurality of different radio access technologies and/or radio transmission schemes can be used for data transmission between the user equipment and the access network of the mobile communication network. According to the present invention, it is especially advantageous that—as part of the technology and/or transmission scheme selection—the individual energy efficiency of different radio access technologies and/or transmission schemes is able to be considered (e.g. WiFi technology is typically more power hungry than highly optimized LTE-A technology).

According to a further preferred embodiment of the present invention, at least one out of:

the predefined upper power consumption threshold,
the predefined lower power consumption threshold,
the power consumption policy information is either transmitted, by the user equipment as part of the uplink data, to the radio resource management entity, or obtained directly or indirectly by the radio resource management entity from a subscriber data/repository entity of the mobile communication network.

Thereby, it is advantageously possible to provide the respective information to the radio resource management entity or, generally, to the mobile communication network.

Furthermore, it is preferred according to the present invention that the predefined lower power consumption threshold corresponds to 0 mW (zero mW or zero milliwatts).

Thereby, it is advantageously possible according to the present invention that the power consumption of the user equipment is as low as possible as only situations where the current power consumption of the user equipment exceeds the upper power consumption threshold result in a change of the radio resources of the respective user equipment.

Furthermore, it is preferred according to the present invention that the set of second radio resources comprises using a different base station entity and/or
a different radio access technology and/or
a different transmission scheme compared to applying the set of first radio resources.

Thereby, it is advantageously possible according to the present invention that the radio access technology and/or transmission scheme is used which provides the best link budget at a certain position (of the user equipment). Thereby, it is advantageously possible to minimize the transmission power and hence minimize user equipment power consumption as well as enhancing the EMC (Electromagnetic Compatibility) for the user of the user equipment.

The present invention also relates to a mobile communication network for an enhanced power consumption management of a user equipment using the mobile communication network, wherein the mobile communication network comprises a core network and an access network, wherein the access network comprises a plurality of base station entities, wherein the user equipment is, at least temporarily, in communication exchange—in uplink and/or in downlink direction of uplink and/or downlink data—with the mobile communication network using radio resources of the air interface between the user equipment and the access network such that a plurality of radio access technologies and/or a plurality of radio signal transmission schemes are able to be used for transmitting uplink data from the user equipment towards the access network of the mobile communication network and/or transmitting downlink data from the access network of the mobile communication network towards the user equipment, wherein the mobile communication network comprises a radio resource management entity, and wherein the mobile communication network is configured such that:

a set of first radio resources is assigned, by the radio resource management entity, to the user equipment for transmitting the uplink data and/or for receiving the downlink data, a power consumption information is available to the radio resource management entity, the power consumption information being related to or indicative of the current power consumption of the user equipment using the assigned set of first radio resources, wherein the power consumption information indicates a current power consumption of the user equipment that is either above a predefined upper power consumption threshold or below a predefined lower power consumption threshold, a set of second radio resources is assigned, by the radio resource management entity, to the user equipment for transmitting the uplink data and/or for receiving the downlink data, wherein when using the set of second radio resources, the current power consumption of the user equipment using the assigned set of second radio resources corresponds to a power consumption in between the lower power consumption threshold and the upper power consumption threshold.

Thereby it is advantageously possible, that—also with respect to the mobile communication network—the user equipment power budget is taken as an additional input into the calculation of the radio resource management entity and corresponding scheduling decisions of the mobile communication network. This typically results in an enhanced battery performance of the user equipment which eventually also leads to a lower overall energy consumption associated with mobile communication. Via the radio resource management entity (or generally the mobile communication network) having a power consumption information (or at least an estimation thereof or a rough indication relating to the current power consumption, such as, e.g. different classes of current power consumption, for example from 1 to 10 or from 0 to 7) of the respective user equipment, it is advantageously possible to individually adapt the radio resources for that user equipment.

Furthermore, the present invention relates to a program comprising a computer readable program code which, when executed on a computer or on a network node of a mobile communication network, especially a radio resource management entity, causes the computer or the network node of the mobile communication network to perform exemplary embodiments of the inventive method.

The present invention also relates to a computer program product for using a telecommunications network, the computer program product comprising a computer program stored on a storage medium, the computer program comprising program code which, when executed on a computer or on a network node of a mobile communication network, especially a radio resource management entity, causes the computer or the network node of the mobile communication network to perform exemplary embodiments of the inventive method.

It is, however to be understood that the implementation of the inventive method does not necessarily need to rely on physical machines such as hardware components or the like. The "network node of the telecommunications network" or the "network node of a further telecommunications network" can also be realized via software or via virtual machines.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a mobile communication network 100 is schematically shown. In the example, the mobile communication network 100 comprises an access network 110 and a core network 120. The mobile communication network 100 is preferably a cellular telecommunications network comprising typically a plurality of network cells, wherein two radio cells are represented in FIG. 1 by means of reference signs 11 and 12: a first radio cell 11, and a second radio cell 12. The access network 110 comprises at least a first base station entity 111 serving the first radio cell 11, and a second base station entity 112, serving the second radio cell 12. A plurality of user equipments 20, 21, 22 are schematically depicted in FIG. 1 as examples of user equipments in contact with the telecommunications network 100. The user equipments comprise a first user equipment 21, a second user equipment 22, and a third user equipment 23. The user equipments 21, 22, 23 are connected to a radio resource management entity 121 of the mobile communication network 100. The mobile communication network 100 also comprises or is connected to a subscriber data/repository 122. The reconfiguration of the radio resources (via the functionality provided by the radio resource management entity 121) is exemplarily provided for one (specific) user equipment among the plurality of user equipments 20, 21, 22. The specific user equipment is hereinafter typically designated by reference sign 20. Of course, also the other user equipments of the user equipment connected to the mobile communication network 100 (or camping on the mobile communication network 100) could be specific user equipments realizing a power driven radio resource management.

Exemplary embodiments of the present invention provide a method and a mobile communication network 100 for enhanced power consumption management of a (specific) user equipment 20 using the mobile communication network 100.

The user equipment 20 is at least temporarily, in communication exchange—in uplink and/or in downlink direction—with the mobile communication network 100 using radio resources of the air interface between the user equipment 20 and the access network 100. This means that the power driven radio resource management functionality be applied to user equipments 20 in idle mode or user equipments 20 in connected mode.

Typically, a plurality of radio access technologies and/or a plurality of radio signal transmission schemes are able to be used for
    transmitting uplink data from the user equipment 20 towards the access network 110 of the mobile communication network 100 and/or
    transmitting downlink data from the access network 110 of the mobile communication network 100 towards the user equipment 20.

Figure 2:
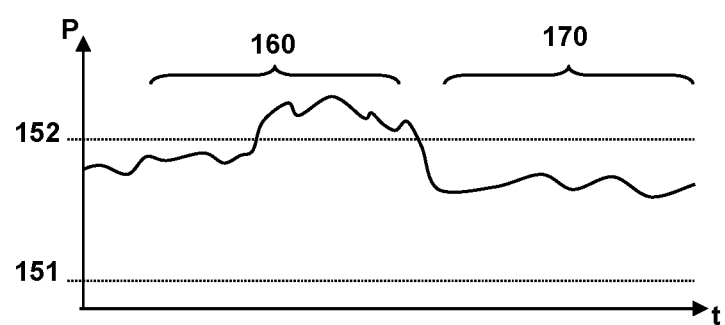
FIG. 2 schematically illustrates a diagram of the current power consumption of a user equipment connected to the mobile communication network.

The mobile communication network 100 comprises the radio resource management entity 121 determining the radio resources to be assigned to the user equipment 20, i.e. a set of first radio resources at a first point in time for transmitting the uplink data and/or for receiving the downlink data, and a set of (different) second radio resources at a second (subsequent) point in time in case that the power consumption information (being related to or indicative of the current power consumption of the user equipment using the assigned set of first radio resources) indicates, to the radio resource management entity 121, a current power consumption of the user equipment that is either above a predefined upper power consumption threshold 152 or below a predefined lower power consumption threshold 152. This is schematically shown in FIG. 2. FIG. 2 shows the evolution of the current power consumption P of the user equipment 20 over time. During a first interval of time, designated by reference sign 160 (and comprising the first point in time, e.g. at the beginning of that time interval), the set of first radio resources are assigned to the user equipment 20. During a second interval of time, designated by reference sign 170, the set of second radio resources are assigned to the user equipment 20. What can be seen from FIG. 2, is that at least in the second part of the first interval of time 160 (i.e. after the first point in time), the current power consumption of the user equipment 20 exceeds the upper power consumption threshold 152. After changing the radio resources assigned to the user equipment 20 and applying the set of second radio resources during the second interval of time 170, the current power consumption of the user equipment 20 does not exceed anymore the upper power consumption threshold 152, i.e. the current power consumption of the user equipment 20 using the assigned set of second radio resources corresponds to a power consumption in between the lower power consumption threshold and the upper power consumption threshold.

The current power consumption information can be obtained, by the radio resource management entity 121, via, e.g.

- measurements,
- channel estimation, including the necessary transmit power of the user equipment 20,
- processing power required for the "link mode", e.g. MIMO (Multiple Input Multiple Output), beam forming, higher-order modulation, channel aggregation,
- time, such as MOY (month of year), DOM (day of months), TOD (time of day), weekdays, holidays,
- subscription parameters,
- power strategy or battery status of the user equipment, or whether the user equipment runs on battery or mains power,
- subscriber input, either on the user equipment or via a "service" (such as website).

All of the above may be signaled implicitly or explicitly between the UE and the network.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for power consumption management of a user equipment using a mobile communication network, wherein the mobile communication network comprises a core network and an access network, wherein the access network comprises a plurality of base station entities, wherein the mobile communication network comprises a radio resource management entity, and wherein the method comprises the following steps:
   - in a first step, a set of first radio resources is assigned, by the radio resource management entity, to the user equipment for transmitting uplink data and/or receiving downlink data;
   - in a second step, subsequent to the first step, power consumption information is obtained by the radio resource management entity, the power consumption information indicating that a current rate of power consumption of the user equipment while using the assigned set of first radio resources is above a predefined upper power consumption threshold or below a predefined lower power consumption threshold; and
   - in a third step, subsequent to the second step, in response to the power consumption information indicating that the current rate of power consumption of the user equipment while using the assigned set of first radio resources is above the predefined upper power consumption threshold or below the predefined lower power consumption threshold, a set of second radio resources is assigned, by the radio resource management entity, to the user equipment for transmitting uplink data and/or receiving downlink data, wherein a rate of power consumption of the user equipment while using the assigned set of second radio resources is between the predefined lower power consumption threshold and the predefined upper power consumption threshold.

2. The method according to claim 1, wherein the power consumption information is obtained by the radio resource management entity via receiving the power consumption information from the user equipment.

3. The method according to claim 1, wherein the power consumption information is obtained by the radio resource management entity via the radio resource management entity determining a likely current rate of power consumption of the user equipment based on:
   - an indication or a command by the radio resource management entity to the user equipment; and/or
   - knowledge of the radio resource management entity that the user equipment is using a certain transmission power level and/or a certain radio signal transmission scheme for transmitting the uplink data; and/or
   - the radio resource management entity performing a channel estimation in relation to the set of first radio resources that are available for the user equipment.

4. The method according to claim 1, wherein, in addition to the power consumption information, power consumption policy information is obtained by the radio resource management entity, wherein the power consumption policy information comprises:
   - an indication of prioritizing the choice of radio resources such that a rate of power consumption of the user equipment stays between the predefined lower power consumption threshold and the predefined upper power consumption threshold; or
   - an indication of prioritizing the choice of radio resources such that providing a certain quality-of-service to the user equipment is fulfilled with the rate of power consumption of the user equipment being allowed to exceed the predefined upper power consumption threshold.

5. The method according to claim 1, wherein the set of second radio resources is determined by the radio resource management entity using:
   a priori knowledge of physical parameters and associated power consumption needs of different radio access technologies and/or radio signal transmission schemes; and/or
   a channel estimation in relation to the set of second radio resources; and/or
   power consumption related information regarding other user equipments within the mobile communication network.

6. The method according to claim 1, wherein the user equipment and the mobile communication network are configured to communicate using a plurality of radio access technologies, wherein the plurality of radio access technologies comprise at least one out of the following:
   radio access technologies using a licensed or an unlicensed radio spectrum;
   radio access technologies using GPRS/EDGE and/or UMTS/HSPA and/or LTE/LTE-A and/or 5G technologies and/or WIFI;
   radio access technologies and/or radio signal transmission schemes using higher-order modulation and/or power control and/or multiple input/multiple output (MIMO) and/or beam forming and/or carrier aggregation;
   radio access technologies using Narrow-Band radio technologies for Internet-of-Things (NB-IoT).

7. The method according to claim 4, wherein at least one out of: the predefined upper power consumption threshold, the predefined lower power consumption threshold, or the power consumption policy information is obtained by the radio resource management entity from the user equipment or from a subscriber data/repository entity of the mobile communication network.

8. The method according to claim 1, wherein the predefined lower power consumption threshold corresponds to 0 mW.

9. The method according to claim 1, wherein using the set of second radio resources corresponds to:
   using a different base station entity relative to the set of first radio resources; and/or
   using a different radio access technology relative to the set of first radio resources;
   and/or using a different transmission scheme relative to the set of first radio resources.

10. A mobile communication network for enhanced power consumption management of a user equipment using the mobile communication network, wherein the mobile communication network comprises:
    a core network; and
    an access network;
    wherein the access network comprises a plurality of base station entities;
    wherein the mobile communication network further comprises a radio resource management entity;
    wherein the radio resource management entity is configured to:
        assign a set of first radio resources to the user equipment for transmitting uplink data and/or receiving downlink data;
        obtain power consumption information indicating that a current rate of power consumption of the user equipment while using the assigned set of first radio resources is above a predefined upper power consumption threshold or below a predefined lower power consumption threshold; and
        in response to the power consumption information indicating that the current rate of power consumption of the user equipment while using the assigned set of first radio resources is above the predefined upper power consumption threshold or below the predefined lower power consumption threshold, assign a set of second radio resources to the user equipment for transmitting uplink data and/or receiving downlink data, wherein a rate of power consumption of the user equipment while using the assigned set of second radio resources is between the predefined lower power consumption threshold and the predefined upper power consumption threshold.

11. A non-transitory computer-readable medium having processor-executable instructions stored thereon for power consumption management of a user equipment using a mobile communication network, wherein the mobile communication network comprises a core network and an access network, wherein the access network comprises a plurality of base station entities, wherein the mobile communication network comprises a radio resource management entity, wherein the processor-executable instructions, when executed, facilitate the following steps:
    in a first step, a set of first radio resources is assigned, by the radio resource management entity, to the user equipment for transmitting uplink data and/or receiving downlink data;
    in a second step, subsequent to the first step, power consumption information is obtained by the radio resource management entity, the power consumption information indicating that a current rate of power consumption of the user equipment while using the assigned set of first radio resources is above a predefined upper power consumption threshold or below a predefined lower power consumption threshold; and
    in a third step, subsequent to the second step, in response to the power consumption information indicating that the current rate of power consumption of the user equipment while using the assigned set of first radio resources is above the predefined upper power consumption threshold or below the predefined lower power consumption threshold, a set of second radio resources is assigned, by the radio resource management entity, to the user equipment for transmitting uplink data and/or receiving downlink data, wherein a rate of power consumption of the user equipment while using the assigned set of second radio resources is between the predefined lower power consumption threshold and the predefined upper power consumption threshold.

* * * * *